United States Patent
Nishita et al.

(10) Patent No.: US 8,864,877 B2
(45) Date of Patent: Oct. 21, 2014

(54) METHOD FOR REDUCING EVAPORATED FUEL EMISSION, CANISTER AND ADSORBENT THEREFOR

(71) Applicant: Kuraray Chemical Co., Ltd., Bizen (JP)

(72) Inventors: Mitsunori Nishita, Bizen (JP); Mitsunori Hitomi, Okayama (JP); Takayuki Yamada, Okayama (JP)

(73) Assignee: Kuraray Chemical Co., Ltd., Bizen-shi (JP)

( * ) Notice: Subject to any disclaimer, the term of this patent is extended or adjusted under 35 U.S.C. 154(b) by 64 days.

(21) Appl. No.: 13/761,423

(22) Filed: Feb. 7, 2013

(65) Prior Publication Data

US 2013/0269521 A1   Oct. 17, 2013

(30) Foreign Application Priority Data

Feb. 10, 2012 (JP) ................................ 2012-027233
Feb. 5, 2013 (JP) ................................ 2013-020368

(51) Int. Cl.
   *F02M 25/08* (2006.01)
   *B01D 53/04* (2006.01)
   *F02M 35/02* (2006.01)

(52) U.S. Cl.
   CPC ........... *F02M 35/0218* (2013.01); *B01D 53/04* (2013.01); *B01D 2253/30* (2013.01); *B01D 2253/102* (2013.01); *F02M 25/0854* (2013.01)
   USPC .................. 95/146; 96/132; 96/133

(58) Field of Classification Search
   CPC ............. F02M 25/08; F02M 25/0854; F02M 35/0218; B01D 53/04; B01D 2253/102; B01D 2253/30; B01D 2257/70
   USPC ........ 95/143, 146; 96/130, 132, 133; 123/519
   See application file for complete search history.

(56) References Cited

U.S. PATENT DOCUMENTS

| | | | |
|---|---|---|---|
| 7,462,224 B2 * | 12/2008 | Wolff | 96/132 |
| 2012/0186563 A1 * | 7/2012 | Hasegawa et al. | 123/519 |
| 2012/0304865 A1 * | 12/2012 | Sugiura et al. | 96/131 |
| 2013/0160651 A1 * | 6/2013 | Mani | 96/132 |
| 2013/0263740 A1 * | 10/2013 | Mani | 96/112 |

FOREIGN PATENT DOCUMENTS

| | | |
|---|---|---|
| JP | 2005-510654 | 4/2005 |
| JP | 2009-19572 | 1/2009 |
| WO | 03/046362 A1 | 6/2003 |
| WO | 2009/031467 A1 | 3/2009 |

* cited by examiner

*Primary Examiner* — Frank Lawrence
(74) *Attorney, Agent, or Firm* — Oblon, Spivak, McClelland, Maier & Neustadt, L.L.P.

(57) ABSTRACT

To provide an adsorbent which achieves a low-emission performance while maintaining the adsorption performance for adsorbing an evaporated fuel component, a canister comprising the adsorbent, and a method for reducing evaporated fuel emission. A second adsorbent (e.g., a granule) filled in a second compartment disposed in a downstream side with respect to a first compartment comprises an activated carbon as an adsorption site and a solid diluent as a non-adsorption site. The adsorbent has a difference in n-butane adsorption volume of not less than 35 g/L between a n-butane vapor concentration of 5% by volume and a n-butane vapor concentration of 50% by volume measured at 25° C., a butane working capacity measured in accordance with ASTM D5228 of not less than 8 g/dL, and a butane desorption rate of not less than 45% when a purge air amount measured in accordance with ASTM D5228 is 30 bed volumes of the adsorbent volume.

22 Claims, 2 Drawing Sheets

METHOD FOR REDUCING EVAPORATED FUEL EMISSION, CANISTER AND ADSORBENT THEREFOR

TECHNICAL FIELD

The present invention relates to a method useful for significantly reducing evaporated fuel emission (release of an evaporated fuel) in an evaporated fuel suppressing apparatus (a canister) for adsorbing fuel (e.g., gasoline) vaporized (or evaporated) from a fuel tank of a vehicle (e.g., a motor vehicle) and desorbing the fuel (e.g., gasoline) with driving of an engine to burn the fuel in the engine; a canister for applying the method, and an adsorbent usable for the method and the canister. More specifically, the present invention relates to a method for reducing an emission of an evaporated fuel from a vehicle (e.g., a motor vehicle) by using an activated carbon adsorbent having a specific butane working adsorption performance and a specific butane desorption performance, a canister for effectively using the method, and an adsorbent for the canister.

BACKGROUND ART

A motor vehicle is provided with an evaporated fuel suppressing apparatus (canister) for reducing the release of an evaporated fuel into the atmosphere from a fuel tank of a gasoline internal combustion engine. In general, an adsorbent such as activated carbon is filled into the apparatus, thereby the evaporated fuel is adsorbed and trapped, and during the running of an engine, air is introduced into the canister to desorb the adsorbed evaporated fuel for combusting the desorbed fuel in the engine. In the United States, a large-sized canister (On Board Refueling Vapor Recovery, ORVR) is equipped to trap the gasoline vaporized in oil supply.

In recent years with the increased worldwide attention focused on improvements in the ambient environment and global warming prevention, environmental measures to be required for motor vehicles are getting severer and severer. The United States has LEVII and PZEV as regulations concerning fuel vapor to be discharged from motor vehicles. In the future, these regulations will be strengthened; the LEVII will become LEVITT (almost equivalent to PZEV), which will be introduced and enforced in stages in California from 2014.

In order to accomplish such strict environmental regulations, a canister suitable for fuel motor vehicles, an activated carbon to be filled (or packed) in the canister, and a combination of activated carbons in a canister are under investigation.

Japanese Patent Application Laid-Open Publication No. 2005-510654 (JP-2005-510654A, Patent Document 1) discloses a method for reducing fuel vapor emissions comprising the steps of contacting the fuel vapor with an initial adsorbent and a subsequent adsorbent, the initial adsorbent having incremental adsorption capacity at 25° C. of greater than 35 g n-butane/L between vapor concentrations of 5 vol % and 50 vol % n-butane, and the subsequent adsorbent having an incremental adsorption capacity of less than 35 g n-butane/L between vapor concentrations of 5 vol % and 50 vol % n-butane. According to this document, the low-emission performance is achieved by use of an activated carbon having a general high adsorption performance as the initial adsorbent disposed in the fuel tank side of the canister, and use of an adsorbent having a constant adsorption performance over wide fuel vapor concentrations, not having a high adsorption performance but having a high desorption performance as the subsequent adsorbent disposed in the discharge side. Moreover, this document also discloses the subsequent adsorbent is volumetrically diluted with a non-adsorbing filler.

Japanese Patent Application Laid-Open Publication No. 2009-19572 (JP-2009-19572A, Patent Document 2) discloses that the outside leakage of fuel vapor through an exhaust port of a canister is suppressed, wherein an adsorbent layer located near a port for introducing the fuel vapor comprises an adsorbent having a microporous structure having a pore size ranging from not smaller than 1 nm to smaller than 100 nm, an adsorbent layer located near the exhaust port comprises an adsorbent having the microporous structure and a macroporous structure having a pore size of not smaller than 100 nm. Further, this document discloses combination use of a small granular adsorbent (a formed activated carbon or a pulverized activated carbon) having a microporous structure and a large granular adsorbent (a formed activated carbon) having a particle diameter larger than that of the small granular adsorbent and having a microporous structure and a macroporous structure, and discloses that the large granular adsorbent is obtained by mixing a powdery activated carbon, at least one selected from the group consisting of powdery bentonite, silica sol and alumina sol, serving as a binder, a powdery meltable core material which is able to evaporate with the burning, and water, forming the resulting mixture into a cylindrical shape, and burning the formed mixture after drying.

The canisters described in these documents, however, sometimes deteriorate the low-emission performance when the loading amount to the canisters (an amount of a gasoline component evaporated from a gasoline tank during stopping the motor vehicle) is larger.

In these days, hybrid vehicles, which have a combination of gasoline engine and electric motor, are becoming the mainstream. A hybrid vehicle is confronted with an increase of a loading amount to a canister, since the amount of purge air, which is used for desorbing an adsorbed fuel component in a canister to introduce the evaporated fuel component into an engine as a fuel, is significantly decreased. Even in the case of such a large loading amount to the canister, the achievement of low-emission performance is expected. It is therefore necessary to show both performances, a capacity for trapping the evaporated fuel and a capacity for desorbing the evaporated fuel.

WO2009/031467 A1 (Patent Document 3) discloses use of an adsorbent in which an integrated volume of pores having an average diameter of 3,000 to 100,000 nm as measured with a mercury porosimeter is 6.5 mL/dl or more and an equilibrium adsorption as measured in a n-butane volume concentration of 2,000 ppm is 0.16 g/dl or more, for adsorbing an evaporated fuel gas. This document discloses a process for producing the adsorbent, in which an activated carbon, a smoothing agent, an inorganic compound soluble in an acid (e.g., calcium carbonate), an aggregate resistant against an acid, a binder, and water are mixed and granulated, and the resultant is dried, subjected to particle size regulation, washed with an acid for dissolving the inorganic compound, washed with water, and dried. This document also discloses that, as an example, the total amount of the aggregate and calcium carbonate is not less than 75% by weight relative to 100 parts by weight of the activated carbon. According to this document, however, it is necessary to use the aggregate and the acid-soluble inorganic compound in large quantities, and the adsorbent is still insufficiently efficient in trapping or adsorbing an evaporated fuel gas.

CITED DOCUMENTS

Patent Documents

[Patent Document 1] JP-2005-510654A (Claims)
[Patent Document 2] JP-2009-19572A (Claims)
[Patent Document 3] WO2009/031467 A1 (Claims, Examples)

SUMMARY OF THE INVENTION

Problems to be solved by the Invention

It is therefore an object of the present invention to provide a method for reducing evaporated fuel emission, which achieves the low-emission performance (low-release performance) while maintaining the adsorption performance necessary for adsorbing an evaporated fuel component, as well as a canister and an adsorbent for effectively using this method.

Another object of the present invention is to provide a method for reducing evaporated fuel emission, which achieves the low-emission performance even in the case of a large loading amount to a canister, as well as a canister and an adsorbent for effectively using this method.

It is still another object of the present invention to provide a method for reducing evaporated fuel emission, which allows significant improvement in capacities for trapping and desorbing an evaporated fuel component, as well as a canister and an adsorbent for effectively using this method.

Means to Solve the Problems

The inventors of the present invention made intensive studies to achieve the above objects and finally found that an adsorbent comprising an activated carbon having a high adsorption activity and a solid diluent as an inactive non-adsorption site and having a predetermined butane working capacity and a butane desorption rate achieves both of the adsorption and the desorption performances required for a whole canister, and can reduce the evaporated fuel emission. The present invention was accomplished based on the above findings.

That is, a method according to the present invention reduces the release of an evaporated fuel; the method comprises allowing a gaseous evaporated fuel to flow from at least one first compartment filled with a first adsorbent toward at least one second compartment filled with a second adsorbent for sequentially adsorbing the evaporated fuel onto the first adsorbent and the second adsorbent, and purging a gas from the second compartment toward the first compartment for desorbing the adsorbed fuel (evaporated fuel) from the second adsorbent and the first adsorbent.

In this method, the second adsorbent has: a difference in n-butane adsorption volume of not less than 35 g/L between a n-butane vapor concentration of 5% by volume and a n-butane vapor concentration of 50% by volume measured at 25° C.; a butane working capacity measured in accordance with ASTM D5228 of not less than 8 g/dL; a butane desorption rate of not less than 45% when a purge air amount measured in accordance with ASTM D5228 is 30 bed volumes of the adsorbent volume; and the second adsorbent comprises an activated carbon as an adsorption site and a solid diluent as a non-adsorption site.

Moreover, a method according to the present invention reduces the release of an evaporated fuel, which comprises adsorbing and desorbing a gaseous evaporated fuel using a canister, the canister comprising at least one first compartment, at least one second compartment communicating with the first compartment and being disposed in a downstream side with respect to the first compartment, and an adsorbent for being filled in the first compartment and the second compartment. In this method, a second adsorbent in the second compartment has: a difference in n-butane adsorption volume of not less than 35 g/L between a n-butane vapor concentration of 5% by volume and a n-butane vapor concentration of 50% by volume measured at 25° C.; a butane working capacity measured in accordance with ASTM D5228 of not less than 8 g/dL; a butane desorption rate of not less than 45% when a purge air amount measured in accordance with ASTM D5228 is 30 bed volumes of the adsorbent volume; and the second adsorbent comprises an activated carbon as an adsorption site and a solid diluent as a non-adsorption site.

According to the present invention, since the difference in n-butane adsorption volume is large, the leakage of an evaporated fuel can be prevented effectively even in the case where the concentration of the evaporated fuel is varied greatly. In particular, a large difference in n-butane adsorption volume of the second adsorbent as well as large butane working capacity and butane desorption rate allow the effective adsorption and desorption of a fuel (e.g., gasoline) even in a small capacity (volume) of a canister and can suppress the release of the evaporated fuel while trapping the evaporated fuel even in a small amount of purge air. Accordingly, the present invention achieves both trapping and low emission of the evaporated fuel.

The second adsorbent in the second compartment may have a volume of about 5 to 30% relative to a total internal volume of the first and second compartments. Moreover, the adsorbent (the second adsorbent) may comprise a granule containing an activated carbon and a solid diluent (or an inactive solid carrier). For example, the adsorbent may comprise a granule containing 50 to 150 parts by mass (e.g., 60 to 140 parts by mass) of the solid diluent relative to 100 parts by mass of the activated carbon. The solid diluent may comprise at least one member selected from the group consisting of a metal oxide, a metal carbonate, and a graphite. For example, the solid diluent may comprise magnesium oxide and/or a graphite. Further, the adsorbent (the second adsorbent) may comprise a granule comprising an activated carbon, a solid diluent soluble in a solvent or a chemical solution, and a binder insoluble in the solvent or the chemical solution, wherein the solid diluent is partly eluted and removed with the solvent or the chemical solution from the granule. The granule may comprise, for example, an activated carbon, a solid diluent soluble in an acid, and a binder resin insoluble in an acid, wherein the solid diluent is partly eluted and removed with the acid from the granule. Specifically, the granule may comprise an activated carbon, a solid diluent soluble in an acid, and a binder resin insoluble in an acid, wherein the ratio of the solid diluent relative to 100 parts by mass of the activated carbon is 40 to 150 parts by mass, and the solid diluent (e.g., calcium carbonate) is partly eluted with the acid from the granule.

The present invention also includes a canister comprising: a casing including at least one first compartment, at least one second compartment communicating with the first compartment and being disposed in a downstream side with respect to the first compartment; an adsorbent for being filled in the first compartment and the second compartment and for adsorbing and desorbing a gaseous evaporated fuel (vaporized fuel); an introducing (or intake) port of the casing, for introducing an evaporated fuel (vaporized fuel) into the first compartment; and an exhaust port of the casing, for exhausting an air flow from a lowermost-stream compartment. In the canister, a first adsorbent is filled in the first compartment, a second adsorbent, having a lower capacity for adsorbing an evaporated fuel (vaporized fuel) than that of the first adsorbent, is filled in the second compartment, and the evaporated fuel (vaporized fuel) adsorbed onto the adsorbent in each compartment is desorbed from the adsorbent by a suction gas from the exhaust port. The present invention further includes a motor vehicle provided with the canister. In the canister, the adsorbing having the above-mentioned characteristics is used as the second adsorbent.

The canister may comprise a single casing or may comprise a first casing comprising at least a first compartment and a second casing coupling with the first casing in series and comprising at least a second compartment.

The present invention also includes an adsorbent for reducing the release of an evaporated fuel, the adsorbent adsorbing a gaseous evaporated fuel (vaporized fuel), which has not been adsorbed by a first adsorbent in at least one first compartment, in at least one second compartment located in the downstream side of the first compartment, and desorbing the adsorbed evaporated fuel. The adsorbent comprise the second adsorbent.

In the specification of this application, the terms "downstream side" and "downstream direction" mean a flow direction of a fluid introduced from an introducing port.

Effects of the Invention

According to the present invention, since the adsorbent having a predetermined butane adsorption amount and a butane desorption rate in a predetermined purge air amount comprises the activated carbon and the solid diluent and is disposed in the second compartment, the low-emission performance of an evaporated fuel is achieved while maintaining the adsorption performance required for the canister. Moreover, the increased load of the purge air amount per adsorbent is allowed, and the evaporated fuel can be treated effectively while improving the desorption rate. Thus, even when the loading amount to the canister is large, the low-emission performance (the reduction of the evaporated fuel emission) is achievable. Further, since the capacity for trapping and desorbing the evaporated fuel component can be significantly improved even under a low purge air amount condition (a large load condition to the canister), the present invention is preferable for a hybrid vehicle, which is designed to use the canister at lower purge air amount compared with conventional one.

BRIEF DESCRIPTION OF DRAWINGS

FIG. 1 is a schematic view showing an embodiment of an evaporated fuel suppressing apparatus (a canister).

FIG. 2 is a graph showing a relationship between a mixing percentage of a second adsorbent and an amount of evaporated fuel emission.

MODE FOR CARRYING OUT THE INVENTION

Hereinafter, the present invention will be explained in detail with reference to the drawings if necessary.

Figure 1:
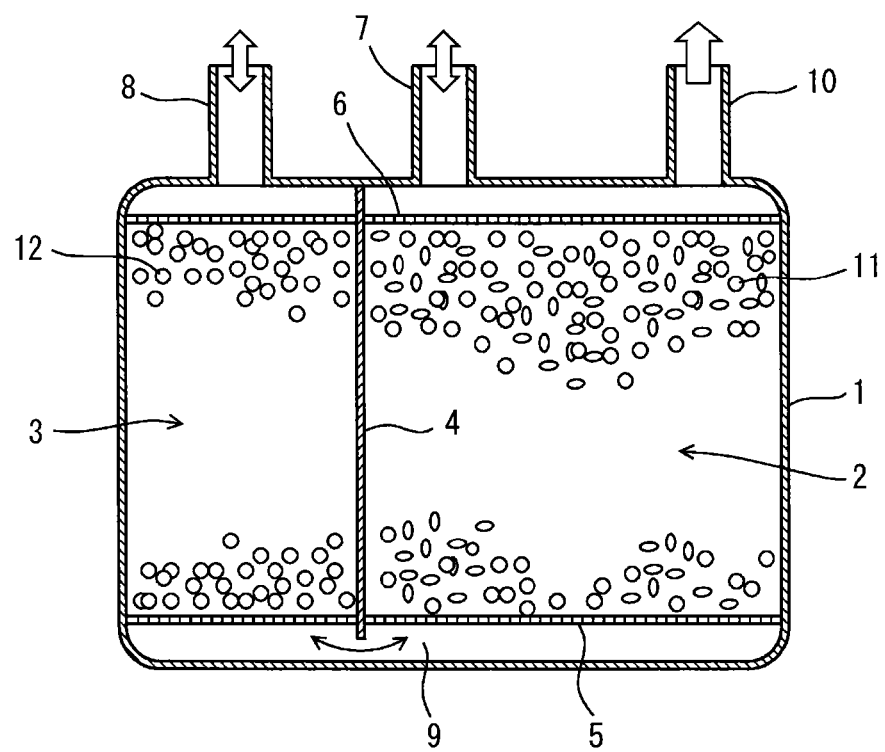
[FIG. 1]

FIG. 1 is a schematic view showing an embodiment of an evaporated fuel suppressing apparatus (a canister). The canister comprises a casing 1 having a first compartment (main chamber) 2 and a second compartment (auxiliary chamber) 3 located in a downstream area of the first compartment (main chamber), the first and second compartments being divided by a partition (wall) 4; an introducing port 7 of (or formed on) the casing, for introducing an evaporated fuel from a fuel tank into the first compartment 2; and an exhaust port 8 of (or formed on) the casing 1, for discharging an air flow from the second compartment 3.

In the side of an extended end of the partition 4 in the casing 1, a porous dispersion plate 5 provided with a filter is disposed. The casing 1 has a passage (or path) 9 between the extended end of the partition 4 and the casing 1, for allowing the first compartment (main chamber) 2 to communicate with the second compartment (auxiliary chamber) 3. Further, a porous dispersion plate 6 provided with a filter is disposed at the side of the introducing port 7 and the exhaust port 8 in the casing 1 [the first compartment (main chamber) 2 and the second compartment (auxiliary chamber) 3]. The casing 1 has a supply port 10 communicating with the first compartment (main chamber) 2, the supply port being connected to an engine inlet system.

The first compartment (main chamber) 2 has a first adsorbent 11 filled or accommodated therein, and the second compartment (auxiliary chamber) 3 has a second adsorbent 12 filled or accommodated therein. The second adsorbent 12 has a difference in n-butane adsorption volume of not less than 35 g/L between a n-butane vapor concentration of 5% by volume and a n-butane vapor concentration of 50% by volume measured at 25° C., and a butane working capacity of not less than 8 g/dL measured in accordance with ASTM D5228.

In the canister, if an engine of a motor vehicle is stopped, the fuel evaporated from a fuel tank is introduced into the first compartment 2 through the introducing port 7 and adsorbed onto the first adsorbent 11, introduced into the second compartment 3 through the passage 9 and adsorbed onto the second adsorbent 12, and is discharged from the exhaust port 8. If the engine of the motor vehicle is driven, air is sucked from the exhaust port 8 of the second compartment 3, which is located in the lowermost (or the most downward) stream, toward the first compartment 2. Specifically, if the engine of the motor vehicle is driven, the suction gas from the exhaust port desorbs (liberates or releases) the adsorbed evaporated fuel from the second adsorbent 12 of the second compartment 3 and from the first adsorbent 11 of the first compartment 2, and the desorbed evaporated fuel is supplied to the engine through the supply port 10.

The canister sufficiently comprises at least one first compartment (main chamber) and at least one second compartment (auxiliary chamber), and each of the first compartment (main chamber) and the second compartment (auxiliary chamber) may comprise single or a plurality of compartments. The first compartment (main chamber) and the second compartment (auxiliary chamber) are arranged in series. A plurality of the first compartments (main chambers) and a plurality of the second compartments (auxiliary chambers) may be arranged in parallel, if necessary. Moreover, the introducing port is sufficient to be formed in the casing to communicate with the first compartment located in the uppermost stream side; the exhaust port is sufficient to be formed in the casing to communicate with the second compartment located in the lowermost stream side.

Moreover, the volume of the second adsorbent in the second compartment relative to the total internal volume of the first and second compartments may be about 5 to 30%, preferably about 10 to 25%, and more preferably about 10 to 20%. In the present invention, a specified second adsorbent accommodated or filled in the second compartment can also reduce the volume of the adsorbent in the second compartment.

Further, the casing may comprise a single casing or a plurality of casings as far as the casing is divided into a plurality of chambers communicating with each other (chambers disposed in series). For example, the casing may comprise a first casing containing at least a first compartment located in the uppermost stream (the most upstream side) and a second casing which is coupled with the first casing in series and contains at least a second compartment located in the lowermost stream (the most downstream side).

According to the canister, it is necessary to adsorptively treat a gaseous evaporated fuel which has not been adsorbed by the first adsorbent with the second adsorbent located in downstream side with the stopping of the engine, and to desorb (liberate) the adsorbed evaporated fuel from the second adsorbent and the first adsorbent with the driving of the engine. Thus, the second adsorbent requires high capability of adsorbing the evaporated fuel and high capability of desorbing the adsorbed evaporated fuel, which are incompatible with each other.

According to the present invention, in order to achieve the compatibility between high capability of adsorbing the evaporated fuel and high capability of desorbing the adsorbed evaporated fuel, an adsorbent, as the second adsorbent, comprises an activated carbon and a solid diluent, has a high butane working capacity and has a high butane desorption rate. Thus, in the present invention, the second adsorbent having a high butane working capacity can effectively trap or adsorb a gas generated during a motor vehicle's stopping, compared with conventionally used adsorbents, so that the release (or emission) of the evaporated fuel can be reduced. In addition, the second adsorbent can desorb the adsorbed evaporated fuel component even under a low purge air amount condition (a large load condition to the canister), so that the adsorbed evaporated fuel can be used efficiently. The adsorbent (the second adsorbent) practically has a lower adsorbing capacity for the evaporated fuel than that of the first adsorbent.

Specifically, the adsorbent (the second adsorbent) has a large difference in n-butane adsorption volume between a n-butane vapor concentration of 5% by volume and a n-butane vapor concentration of 50% by volume measured at 25° C. in accordance with JIS (Japanese Industrial Standards) K 1474 "Method of Adsorbing Solvent Vapor", the difference is not less than 35 g/L. The difference in n-butane adsorption volume is, for example, about 35 to 60 g/L, preferably about 36 to 55 g/L, and more preferably about 36 to 50 g/L (e.g., about 37 to 48 g/L). Since the difference in n-butane adsorption volume is as large as not less than 35 g/L, the leakage of the evaporated fuel can be prevented in a wide concentration range even if the concentration of the evaporated fuel is varied. A difference of less than 35 g/L in n-butane adsorption volume significantly increases the release amount (emission amount) of the evaporated fuel. Moreover, the release amount of the evaporated fuel not only simply depends on the difference in n-butane adsorption volume but also probably concerns the butane working capacity and the butane desorption rate complicatedly. The n-butane adsorption volume in the n-butane vapor concentration of 50% by volume is larger than that in the n-butane vapor concentration of 5% by volume.

The adsorbent (the second adsorbent) has a butane working capacity (BWC) of not less than 8 g/dL (e.g., about 8 to 15 g/dL), preferably about 8.5 to 13 g/dL, and more preferably about 9 to 12.5 g/dL (e.g., 9.5 to 11.5 g/dL) in accordance with ASTM D5228. Too small butane working capacity of the second adsorbent makes it difficult to effectively adsorb the evaporated fuel and to reduce the release of the evaporated fuel. Too large butane working capacity of the second adsorbent sometimes lowers the desorption rate of the adsorbed evaporated fuel.

Moreover, when the purge air amount measured in accordance with ASTM D5228 is 30 bed volumes of the adsorbent volume, the adsorbent (the second adsorbent) has a butane desorption rate of not less than 45% (e.g., about 45 to 70%), preferably about 45 to 65% (e.g., about 46 to 60%), and more preferably about 45 to 55%. Too small butane desorption rate hinders effective reuse of the adsorbed evaporated fuel as a fuel, and too large butane desorption rate sometimes lowers efficient adsorption of the evaporated fuel.

The purge air amount means an air amount aerated for desorbing the adsorbed evaporated fuel. In the present invention, by a measuring method in accordance with ASTM, the evaporated fuel desorption performance of the adsorbent is evaluated based on the butane desorption rate at the time when 30 bed volumes of the air amount relative to the volume of an adsorbent is purged. The purge air amount of a conventional canister in the performance evaluation is considered as 300 to 400 bed volumes of the canister volume. In contrast, the present invention assumes that the purge air amount is as low as 70 to 150 bed volumes of the canister volume, and thus the butane desorption rate in the above 30 bed volumes of the purge air amount is used as an index of a high desorption performance of the adsorbent or activated carbon in a large loading amount to the canister.

According to the present invention, since the adsorbent (the second adsorbent) has a predetermined difference in n-butane adsorption volume, a predetermined butane working capacity and a predetermined butane desorption rate, both trapping and low emission of the evaporated fuel can be compatible with each other even at a small purge air amount for desorbing the fuel (e.g., gasoline).

The activated carbon as a basis of the adsorbent (the second adsorbent) is obtainable by carbonizing and activating a carbonaceous material as a raw material. The carbonaceous material is not particularly limited to a specific one as far as activation of the carbonaceous material results in formation of an activated carbon. The carbonaceous material can be selected widely from a plant material, a mineral material, a natural material, a synthetic material, and other materials. Specifically, the plant carbonaceous material may include, for example, a wood, a bamboo, a charcoal, a chaff (a rice hull), and a fruit shell (such as a coconut shell). The mineral carbonaceous material may include, for example, a coal (e.g., peat, lignite, subbituminous coal, bituminous coal, semianthracitic coal, and anthracite coal), a petroleum and/or a petroleum pitch, and a coke. As the natural material (or natural polymer), there may be mentioned, for example, a starch, a cellulose (e.g., a natural fiber such as a cotton or a hemp), a regenerated resin (e.g., a regenerated fiber such as a rayon or a viscose rayon), and a semisynthetic resin [e.g., a semisynthetic fiber such as a cellulose ester (e.g., an acetate or a triacetate)]. The synthetic material (or synthetic polymer) may include, for example, a polyamide-series resin (such as a nylon 66), a poly(vinyl alcohol)-series resin (such as a vinylon), an acrylic resin (such as a polyacrylonitrile-series resin), a polyolefinic resin (such as a polyethylene or a polypropylene), a vinyl chloride-series resin, a polyurethane-series resin, a phenol-series resin, a furan-series resin, and an epoxy resin. These carbonaceous materials may be used singly or in combination.

Among these carbonaceous materials, the mineral carbonaceous material, in particular a coal as a carbonaceous material provides an activated carbon having pores suitable for adsorbing and desorbing the evaporated fuel and shows a high evaporated fuel adsorption performance. Thus, the mineral carbonaceous material (in particular, a coal such as bituminous coal or anthracite coal) is preferred as a raw material of an activated carbon as a basis of the adsorbent according to the present invention.

The carbonization and activation condition of the carbonaceous material is not particularly limited to a specific one, and a conventional condition can be used. The carbonization of the carbonaceous material can usually be carried out with oxygen or air shielded, for example, at about 400 to 800° C., preferably about 500 to 800° C., and more preferably about 550 to 750° C. Moreover, the activation can be conducted by usually allowing a carbonized carbonaceous material to react with an activation gas (e.g., water vapor and carbon dioxide gas), for example, at about 700 to 1100° C. and preferably about 800 to 980° C. (e.g., about 850 to 950° C.)

The activated carbon has a BET specific surface area of, for example, about 250 to 1500 $m^2/g$, preferably about 350 to 1200 $m^2/g$, and more preferably about 500 to 1000 $m^2/g$.

The activated carbon may have, as an adsorption performance, a butane working capacity (BWC) of not less than 10 g/dL (e.g., about 10 to 20 g/dL), preferably not less than 12.5 g/dL (e.g., about 12.5 to 17 g/dL), more preferably about 13 to 15 g/dL, and about 10 to 17 g/dL (e.g., about 11 to 15 g/dL) in accordance with ASTM D5228.

The activated carbon can usually be employed in the form of a particulate (or a powder or a granule). The powdery activated carbon may have an average particle diameter (or an average particle size) of, for example, about 1 to 500 μm, preferably 5 to 100 μm, more preferably 10 to 50 μm.

The activated carbon has an average pore diameter (or an average pore size) of, for example, about 0.1 to 100 nm, preferably about 0.3 to 50 nm (e.g., about 0.3 to 25 nm), and more preferably about 0.5 to 10 nm (e.g., about 0.5 to 5 nm).

The solid diluent may comprise an inactive (or inert) solid carrier, which does not contribute to adsorption and is inactive to adsorption. Specifically, a solid carrier having adsorption capacity and/or desorption capacity as the solid diluent allows the evaporated fuel to remain on the solid diluent itself, reduces the capacity to desorb the adsorbed evaporated fuel.

As the solid diluent, either an organic substance or an inorganic substance can be used. The organic substance may include, for example, a resin [e.g., a polyolefin-series resin, a crystalline resin such as a poly(ethylene terephthalate)]. The inorganic substance may include, for example, a metal oxide (e.g., iron oxide, alumina, silica or glass, magnesium oxide, and manganese oxide), a metal hydroxide (e.g., calcium hydroxide and magnesium hydroxide), a metal carbonate (e.g., calcium carbonate and magnesium carbonate), and a graphite. These solid diluents may be used singly or in combination. The metal of the inorganic matter may be a polyvalent metal (such as an alkaline earth metal) in practical cases. Among these solid diluents, the preferred one is a component having a high granulation property (or granulative property), for example, a metal oxide (such as magnesium oxide) and a graphite.

The solid diluent is usually employed in the form of a particulate (or a powder or a granule), and may have an average particle diameter selected from the range of, for example, about 0.01 to 100 μm, and usually about 0.01 to 30 μm, preferably about 0.05 to 10 μm, and more preferably about 0.1 to 5 μm (e.g., about 0.1 to 2 μm). The ratio of the average particle diameter of the activated carbon relative to the average particle diameter of the solid diluent may for example be about 100/1 to 0.01/1, preferably about 50/1 to 1/1, and more preferably about 25/1 to 2/1 (e.g., about 15/1 to 3/1) in a ratio of the former/the latter. A specific ratio of both average particle diameters can increase a contact efficiency of an air flow (or atmospheric air flow) containing the evaporated fuel as well as a purge air, and the adsorption/desorption efficiency of the evaporated fuel can be improved.

The amount of the solid diluent relative to the activated carbon can be selected optionally depending on the species of the activated carbon, and in general, the desorption efficiency to the evaporated fuel at the same air purge amount can be improved with the increase of the ratio of the solid diluent relative to the activated carbon. In the case where the ratio of the solid diluent is too small, the desorption performance cannot be improved, while the adsorption performance necessary for adsorbing the evaporated fuel can be achieved. In contrast, in the case where the ratio of the solid diluent is too large, the necessary adsorption performance cannot be maintained, while the desorption performance for desorbing the adsorbed evaporated fuel is improved. Thus, in order to achieve both a desired adsorption performance and a desired desorption performance, it is necessary to mix the solid diluent and the activated carbon in an appropriate ratio. For example, the amount of the solid diluent relative to 100 parts by mass of the activated carbon can be selected from the range of about 50 to 150 parts by mass (e.g., about 55 to 145 parts by mass) and is usually about 60 to 140 parts by mass (e.g., about 60 to 130 parts by mass) and preferably about 60 to 120 parts by mass. In the present invention, the reduction of the amount of the solid diluent relative to the activated carbon allows the adsorbed evaporated fuel to be trapped or adsorbed efficiently and allows the evaporated fuel component to be desorbed even under a low purge air amount condition (a large load condition to the canister), so that the evaporated fuel can be used efficiently while reducing the release of the evaporated fuel.

In the adsorbent (the second adsorbent), the activated carbon and the solid diluent are sufficient to function as an adsorption site and a non-adsorption site (or a site inactive to adsorption), respectively. The activated carbon and the solid diluent may be separated from each other or may be united. The activated carbon may be diluted in the form of a mixture of the activated carbon and the solid diluent. In order to achieve both desired adsorption performance and desorption performance over a long period of time, the activated carbon is preferably diluted with the solid diluent in the form that the activated carbon and the solid diluent uniformly exist in the second compartment without separation, in particular, in the form of a granule containing the activated carbon and the solid diluent (the united form that the activated carbon and the solid diluent adhere to each other).

The granule can be obtained by mixing a powdery solid diluent and a powdery activated carbon and granulating (and shaping) the mixture. In this granulation method, a general granulation method can be used, which comprises adding a binder to the mixture and forming (or molding) the resulting mixture (for example, extruding granulation, tumbling granulation, spray granulation, and fluidized bed granulation).

The species of the binder is not particularly limited to a specific one as far as the binder is not eluted or deteriorated in a short time under the adsorption and desorption atmosphere of the evaporated fuel. Since the hardness of the resulting granules may be determined depending on the species of the binder and the pore of the activated carbon may be occluded or plugged with the binder, it is necessary to select the species of the binder and adjust (or control) the amount of the binder. The binder may be a thermoplastic resin or a thermosetting resin. The binder may include, for example, a polyolefin-series resin (e.g., a polyethylene, an ethylene-vinyl acetate copolymer, an ethylene-(meth)acrylate copolymer, and an ethylene-(meth) acrylic acid copolymer), an acrylic resin, a polyester-series resin, a polyurethane-series resin, an epoxy-series resin, and a silicone-series resin. These binders may be used singly or in combination. The binder may be a thermally adhesive resin such as hot-melt adhesive or may be aqueous (may be in the form dissolved or dispersed in an aqueous medium) or oily (may be in the form dissolved in an organic solvent). The binder is practically used in the form of a dispersion (in particular, an aqueous dispersion such as an emulsion), such as a polyurethane-series resin emulsion or an acrylic resin emulsion.

The ratio (or amount) of the binder for granulation (and shaping) relative to 100 parts by mass of the activated carbon is, for example, about 5 to 40 parts by mass (e.g., about 5 to 35 parts by mass), preferably about 10 to 30 parts by mass, and more preferably about 15 to 25 parts by mass in terms of solid contents. According to the present invention, the reduction of the amount of the binder relative to the activated carbon improves a contact efficiency of the evaporated fuel and the purge air with the activated carbon, so that the evaporated fuel can be effectively trapped or adsorbed to reduce the release of the adsorbed evaporated fuel and the evaporated fuel component can be desorbed even under a low purge air amount condition. An adsorbent having a practical hardness can be obtained by granulating (and shaping) the mixture with the binder and then drying the resulting granulated product at a predetermined temperature.

In order to adjust (or control) the granulating property (granulative property) and the density of the granulated product (the granule), the granulation is preferably carried out by adding water to the mixture containing the activated carbon and the solid diluent while mixing. The amount of the water is, for example, about 110 to 200 parts by mass (e.g., about 130 to 195 parts by mass) and preferably about 150 to 190 parts by mass relative to 100 parts by mass of the activated carbon.

In order to improve the granulating property, a lubricant may be mixed with the mixture containing the activated carbon and the solid diluent. The lubricant improves the granulating property even in the case where the proportion of the activated carbon and the solid diluent in the whole adsorbent (granulated adsorbent) is large. As the lubricant, there may be used, for example, at least one selected from the group consisting of a bentonite-series compound, a cellulose-series compound, and a poly(vinyl alcohol)-series compound. The bentonite-series compound may include, for example, sodium bentonite and calcium bentonite. The cellulose-series (or cellulosic) compound may include, for example, a cellulose, a cellulose derivative (for example, a cellulose ether, e.g., an alkyl cellulose such as a methyl cellulose; a carboxymethyl cellulose or a salt thereof; a hydroxyalkyl cellulose such as a hydroxyethyl cellulose or a hydroxypropyl cellulose; and a hydroxyalkylalkyl cellulose such as a hydroxypropylmethyl cellulose). As the cellulose-series compound, a methyl cellulose and a carboxymethyl cellulose are preferred. As the poly(vinyl alcohol)-series compound, for example, there may be mentioned a poly (vinyl alcohol) and a variety of modified poly(vinyl alcohol) compounds.

The amount of the lubricant relative to 100 parts by mass of the activated carbon is about 1 to 10 parts by mass (e.g., about 2 to 8 parts by mass) and preferably about 3 to 6 parts by mass.

The adsorbent (the second adsorbent) may be a granule having a pore other than the pore (fine pore) of the activated carbon. This granule corresponds to a granule comprising an activated carbon, a solid diluent (a pore-forming solid diluent, a soluble solid diluent) soluble in a solvent or a chemical solution, and a binder insoluble in the solvent or the chemical solution, wherein the solid diluent is partly eluted with the solvent or the chemical solution for removal from the granule. That is, the adsorbent having a pore can be obtained by granulating or molding a mixture containing the solid diluent and the activated carbon with the binder, drying the granulated product, then washing the dried product with the solvent or the chemical solution to remove at least part of the solid diluent, and drying the product again. The obtained adsorbent usually has a practically usable hardness. The soluble solid diluent may be used in combination with the above-mentioned solid diluent.

The solid diluent (the pore-forming solid diluent) soluble in the solvent or the chemical solution may include, for example, a water-soluble component (e.g., a saccharide (or a sugar) such as sucrose, lactose, glucose, or fructose; and a sugar alcohol such as mannitol, sorbitol, erythritol, or xylitol), a component soluble in an organic solvent (e.g., a homopolymer (a polystyrene) or a copolymer containing styrene as a monomer), an acid-soluble component [for example, an inorganic compound, e.g., a metal oxide (such as magnesium oxide), a metal carbonate (such as magnesium carbonate or calcium carbonate), a metal hydroxide (such as calcium hydroxide); and a basic polymer, e.g., a homopolymer or a copolymer containing N,N-dialkylamino$C_{2-3}$alkyl (meth)acrylate as a monomer], and an alkali-soluble component (for example, an acidic polymer, e.g., a homopolymer or a copolymer containing (meth) acrylic acid as a monomer). These soluble solid diluents may be used singly or in combination. For the elution with the solvent or the chemical solution, a solid diluent forming a low-viscous eluting product is preferred in comparison with a polymer which is liable to be viscous. As the solid diluent, the preferred one is an inorganic compound soluble in an acid (a polyvalent metal compound such as a metal oxide, a metal carbonate, or a metal hydroxide), in particular calcium carbonate.

The average particle diameter of the solid diluent for forming a pore can be selected depending on a desired pore size, and may for example be about 0.1 to 30 μm, preferably about 0.5 to 10 and more preferably about 1 to 5 μm (e.g., about 1 to 2.5 μm). The ratio of the average particle diameter of the activated carbon relative to the average particle diameter of the pore-forming solid diluent may for example be about 300/1 to 0.01/1, preferably about 250/1 to 1/1, and more preferably about 100/1 to 10/1 in a ratio of the former/the latter.

The amount of the solid diluent for forming a pore relative to 100 parts by mass of the activated carbon depends on the desired size and proportion of a pore in the adsorbent and can be selected from the range of about 10 to 150 parts by mass, and is usually about 25 to 150 parts by mass (e.g., about 40 to 150 parts by mass) and preferably about 50 to 130 parts by mass (e.g., about 60 to 120 parts by mass).

The binder may include the same binder as described above. As the binder, usually a binder insoluble in the solvent or the chemical solution for eluting the solid diluent is employed. For example, a water-insoluble binder may include a non-water-soluble resin (e.g., an acrylic resin, a polyester-series resin, a polyurethane-series resin, an epoxy-series resin, and a silicone-series resin). As a binder insoluble in an organic solvent, there may be mentioned a thermosetting resin (e.g., a polyurethane-series resin, an epoxy-series resin, and a silicone-series resin). An acid-insoluble binder may include a resin having an acidic group such as a carboxyl group (e.g., an acrylic resin). As a base-insoluble binder, there may be mentioned a resin having a basic nitrogen atom (e.g., an acrylic resin).

The ratio of the binder relative to 100 parts by mass of the activated carbon is, for example, about 5 to 35 parts by mass, preferably about 10 to 30 parts by mass (e.g., about 12.5 to 30 parts by mass), and more preferably about 15 to 25 parts by mass in terms of solid contents.

Further, as the same as described above, in order to adjust (or control) the granulating property and the density of the granulated product, the granulation is preferably carried out by adding water to the mixture containing the activated carbon and the solid diluent while mixing. The amount of the water is, for example, about 110 to 200 parts by mass (e.g., about 130 to 195 parts by mass) and preferably about 150 to 190 parts by mass relative to 100 parts by mass of the activated carbon.

Further, in order to improve the granulating property, a lubricant may be mixed with the mixture containing the activated carbon and the solid diluent. The amount of the lubricant relative to 100 parts by mass of the activated carbon as the same as described above is about 1 to 10 parts by mass (e.g., about 2 to 8 parts by mass) and preferably about 3 to 6 parts by mass.

With respect to the solid diluent, the water-soluble component can be eluted with water or an aqueous solvent [for example, a mixed solvent composed of water and a water-soluble solvent (such as ethanol, isopropanol, acetone, or tetrahydrofuran)]; the component soluble in an organic solvent can be eluted with, for example, an aliphatic hydrocarbon (such as cyclohexane), an aromatic hydrocarbon (such as toluene), a halogenated hydrocarbon (such as dichloromethane), a ketone (such as acetone or methyl ethyl ketone), an ester (such as ethyl acetate) or an ether (such as tetrahydrofuran), depending on the species of the solid diluent. Moreover, the component soluble in an acid can be eluted with an inorganic acid (such as hydrochloric acid or nitric acid), an organic acid (such as acetic acid, trichloroacetic acid, trifluoroacetic acid, formic acid, or citric acid), or others. In order to elute the component soluble in an acid (such as calcium carbonate), hydrochloric acid is preferably used. The component soluble in an alkali may be eluted with an inorganic base [for example, an alkali metal hydroxide (such as sodium hydroxide or potassium hydroxide) and an alkali metal carbonate (such as sodium carbonate)], an organic base (e.g., triethylamine), or others.

In the adsorbent having a pore formed by elution of the soluble solid diluent, the average diameter of the pore can be selected from the range of about 10 to 10000 nm depending on the species of the solid diluent, the amount thereof, and the degree of elution. The average diameter of the pore is usually about 100 to 8000 nm and preferably about 200 to 5000 nm.

The form or configuration of the granule is not particularly limited to a specific one and may be, for example, a grained form, a spherical form, a pellet form, a rod form, and others. The granules having such forms may be used singly or may be blended in combination. Moreover, the mixture containing the activated carbon and the solid diluent may be formed (or molded) into a honeycomb form or other forms. The granule is preferably in a form having less increase in air-flow resistance and high dispersibility, for example, is in a pellet form. Assuming that the pellet-formed granule has a length L and a diameter D, the ratio L/D of the pellet-formed granule may for example be about 0.4 to 4.

The packing density of the adsorbent can be measured in accordance with JIS K 1474, and the n-butane working capacity can be measured in accordance with ASTM D5228.

The n-butane desorption rate (%) can be calculated by the following measuring procedures in accordance with ASTM D5228.

1) A packing density of an adsorbent is measured in accordance with JIS K 1474.

2) After filling 24 milliliters (mL) of a sample into a glass column with an inner diameter of 17.5 mm and weighed on the basis of the packing density measured in the above section 1) (Ag), the sample is set on a thermobath kept at 25° C.

3) After n-butane (99.9% or more in purity) is aerated into the glass column upstream (or in an up flow state) at a flow rate of 300 mL/minute for 20 minutes or longer, the glass column is removed to weigh the sample (Cg).

4) After the glass column is set again to the thermobath and dry air is aerated into the glass column downstream (or in a down flow state) at a flow rate of 240 mL/minute in an amount of 30 bed volumes relative to the adsorbent volume as air purge, the glass column is removed to weigh the sample (Dg).

5) After the above procedures are conducted, the n-butane desorption rate (%) when aerated in an amount of 30 bed volumes relative to the adsorbent volume as air purge is determined based on the following formula.

$$n\text{-Butane desorption rate} = (Cg-Dg)/(Cg-Ag) \times 100 (\%)$$

Moreover, the capacity of the adsorbent to adsorb the evaporated fuel in the canister and the evaporated fuel emission performance of the adsorbent can be evaluated according to the following measuring procedures.

<Prior Treatment/Adsorption Evaluation to Evaporated Fuel>

1. A canister test machine 1 shown in FIG. 1 is used. The canister test machine 1 has an effective volume of 2200 ml (a first compartment: 1800 ml and a second compartment: 400 ml), and the following ratio of a height/equivalent diameter (the first compartment: 2.6, the second compartment: 1.7). Into the test machine, an activated carbon (manufactured by Kuraray Chemical Co., Ltd., "Activated Carbon KURARAY-COAL 2GK-H") serving as a first adsorbent 2 and the adsorbent according to the present invention serving as a second adsorbent 3 are filled into the first compartment and the second compartment, respectively; and an introducing port 7, an exhaust port 8, and a supply port 10 are closed (In the test in this section, the supply port 10 is always closed, and the introducing port 7 and the exhaust port 8 are opened). It is noted that the equivalent diameter is a diameter of the equivalent circle where the cross section is not circular. The volume of the first compartment and that of the second compartment are relatively adjustable depending on the position of a partition (wall) 4; the first adsorbent 2 has a volume of 1900 ml and the second adsorbent 3 has a volume of 300 ml (total volume: 2200 ml). When the ratio of the second adsorbent 3 is changed to evaluate the evaporated fuel emission, the measurement is carried out by changing the ratio of the first adsorbent relative to the second adsorbent without changing the total volume (2200 ml) of the first and second adsorbents.

2. A pseudo-gasoline vapor (butane:pentane:hexane=25:50:25 ratio by volume) and an air are aerated at 1.5 g/minute and at 500 ml/minute, respectively, into the evaporated fuel gas introducing port 7 of the canister test machine at an ambient temperature of 25° C. as an adsorbing operation. After the concentration at the exhaust port 8 of the canister test machine has arrived at 10000 ppm (breakthrough), aeration is halted (or stopped) and an air is introduced and purged from the exhaust port 8 in an opposite direction to the above adsorption direction at 300 bed volumes relative to the volume of the canister test machine.

3. The above procedures of the operation section 2 are performed at 10 cycles, and the average value of the adsorption amount and the desorption amount at the 10th cycle is evaluated as an evaporated fuel adsorption amount (adsorption amount evaluation of evaporated fuel). Thereafter, an air is introduced and purged from the exhaust port 8 in an opposite direction to the adsorption direction at 400 bed volumes of the volume relative to the canister test machine.

4. Into the canister, 50% by volume of n-butane diluted with air is aerated at 40 g/hour at an ambient temperature of 25° C., and the concentration at the exhaust port 8 of the canister is measured by a hydrocarbon meter. After arrival of the concentration at the exhaust port 8 at 10000 ppm (breakthrough), aeration is halted (or stopped), and an air is introduced and purged from the exhaust port 8 in an opposite direction to the adsorption direction at 150 bed volumes relative to the volume of the canister test machine.

<Measurement of Evaporated Fuel Emission>

1. An ambient temperature is set at 30° C., and the sample is allowed to stand overnight (16 to 20 hours). Thereafter, a pseudo-gasoline vapor supply source is connected to the canister test machine, and the exhaust port 8 of the canister test machine is connected to a Tedlar Bag for leakage measurement by using a pipe or a hose. The Tedlar Bag is a gas-collecting bag which causes no adsorption or infiltration of gas, and is a trade name of DuPont.

2. A pseudo-gasoline vapor and an air are aerated at 0.143 g/minute and at 39 ml/minute, respectively, into the canister test machine; and the leakage amount in aeration at an ambient temperature of 35° C. for 1.5 hours, the leakage amount in aeration at 35° C. for 0.5 hours and then at a raised temperature of 40° C. for 1 hour, and the leakage amount in aeration at 40° C. for 1 hour were measured, and the total leakage amount was calculated (First day).

3. An ambient temperature is set at 30° C., and the sample is allowed to stand for 2 hours. Thereafter, an air is purged at a flow rate of 100 ml/minute for 2 hours. Then, the sample is allowed to stand for 17 hours.

4. A pseudo-gasoline vapor and an air are aerated at 0.137 g/minute and at 38 ml/minute, respectively, in the canister test machine, the leakage amount in aeration at an ambient temperature of 35° C. for 2 hours and the leakage amount in aeration at a raised temperature of 40° C. for 2 hours were measured, and the total leakage amount was calculated (Second day).

5. The gas concentration is determined by a gas chromatograph, and the gas volume is measured by a gas meter. Multiplying the concentration by the volume of the gas inside of the Tedlar Bag gives the leakage amount. Thus the leakage amount on Second day is evaluated as the evaporated fuel emission (evaluation of the evaporated fuel emission).

As the first adsorbent, an adsorbent having an evaporated fuel adsorption capacity higher than that of the second adsorbent can be used. The first adsorbent can be formed with the same activated carbon as the activated carbon serving as the second adsorbent; the activated carbon may be powder, or may be granulated with a binder (for example, granulated in the form of a granule, a pellet, or others) or molded (or shaped) (for example, molded in the form of a honeycomb).

The adsorbent (the second adsorbent) may be filled in a predetermined compartment of the canister by directly mixing the activated carbon and the solid diluent. It is preferable to fill the granule containing the activated carbon and the solid diluent in order to fill uniformly the adsorbent in predetermined each compartment of the canister and to suppress the increase in air-flow resistance (pressure drop).

The present invention also includes a vehicle (e.g., a motor vehicle) provided with the canister, in addition to the adsorbent and the canister. The present invention is applicable to various evaporated fuels, for example, not only ordinary gasoline serving as general motor vehicle fuel but also alcohol-containing gasoline, and others.

EXAMPLES

The following examples are intended to describe this invention in further detail and should by no means be interpreted as defining the scope of the invention.

Experimental Example 1

Comparative Example 1

A coal-based activated carbon (manufactured by Kuraray Chemical Co., Ltd., activated carbon "2GK-H") was used as the first adsorbent and the second adsorbent. For the evaluation of the evaporated fuel emission, the activated carbon was used in a ratio of 1900 ml of the first adsorbent (the above-mentioned "2GK-H") relative to 300 ml of the second adsorbent (the above-mentioned "2GK-H").

Examples 1 to 3

A coal-based activated carbon (manufactured by Kuraray Chemical Co., Ltd., activated carbon "2GK-H") was pulverized by a pulverizer to give a powder having a particle size of not more than 100 μm. In the proportions shown in Table 1 relative to 100 parts by mass of the obtained activated carbon powder (average particle diameter: 25 μm), a solid diluent (average particle diameter: 5 μm), a lubricant [a carboxymethyl cellulose (CMC)], a binder resin (manufactured by Nippon Carbide Industries Co., Inc., an acryl emulsion "Nikasol FX-6074", solid contents: 50% by mass), and water were mixed with the obtained activated carbon powder. The resulting mixture was extruded by a hydraulic extruder to form a molded product having a diameter of 2 mm, and the molded product was cut into 3 to 5 mm length. The cut product was granulated and sized and dried at 120° C. for 12 hours to give a second adsorbent. The performances of the second adsorbent are shown in Table 1. The first adsorbent (the above-mentioned "2GK-H") and the second adsorbent were used in a ratio of 1900 ml of the first adsorbent relative to 300 ml of the second adsorbent, and the evaporated fuel emission was evaluated in accordance with the above-mentioned method.

Examples 4 and 5

In the same manner as in Examples 1 to 3, a coal-based activated carbon (manufactured by Kuraray Chemical Co., Ltd., activated carbon "2GK-H") was pulverized to give an activated carbon powder; and 100 parts by mass of the obtained activated carbon powder (average particle diameter: 25 μm), 100 parts by mass of calcium carbonate (average particle diameter: 0.3 μm), 3.2 parts by mass of a lubricant (CMC), 35 parts by mass of a binder resin (manufactured by Nippon Carbide Industries Co., Inc., an acryl emulsion "Nikasol FX-6074", solid contents: 50% by mass), and 165 parts by mass of water were mixed.

The resulting mixture was extruded by a hydraulic extruder to form a molded product having a diameter of 2 mm, and the molded product was cut into 3 to 4 mm length. The cut product was granulated and sized and dried at 120° C. for 2 to 3 hours. The dried granular product was boiled for washing in a 2 mol/L hydrochloric acid in a ratio of 1 L of the hydrochloric acid relative to 100 parts by mass of the dried granular product to remove a calcium carbonate component from the granular product, and dried again at 120° C. for 12 hours to give a second adsorbent having a pore. Moreover, the evaporated fuel emission was evaluated in the same manner as in Examples 1 to 3.

Comparative Examples 2 to 3

An activated carbon (an activated carbon "BAX-1100" manufactured by MeadWestvaco Corporation) (Comparative Example 2) and an activated carbon (an activated carbon "BAX-LBE" manufactured by MeadWestvaco Corporation) (Comparative Example 3) were used as the second adsorbent. For the evaluation of the evaporated fuel emission, the first adsorbent (the above-mentioned "2GK-H") and the second adsorbent were used in a ratio of 1900 ml of the first adsorbent relative to 300 ml of the second adsorbent.

Comparative Examples 4 to 7

In the same manner as in Examples 1 to 3, a coal-based activated carbon (manufactured by Kuraray Chemical Co., Ltd., activated carbon "2GK-H") was pulverized to give an activated carbon powder. A second adsorbent was obtained in the same manner as in Examples 1 to 3 except that a solid diluent, a lubricant (CMC), a binder resin (manufactured by Nippon Carbide Industries Co., Inc., an acryl emulsion "Nikasol FX-6074") and water were mixed in the proportion shown in Table 2 relative to 100 parts by mass of the obtained activated carbon powder (average particle diameter: 25 μm). For the evaluation of the evaporated fuel emission, the first adsorbent (the above-mentioned "2GK-H") and the second adsorbent were used in a ratio of 1900 ml of the first adsorbent relative to 300 ml of the second adsorbent.

Comparative Examples 8 to 11

In the same manner as in Examples 1 to 3, a coal-based activated carbon (manufactured by Kuraray Chemical Co., Ltd., activated carbon "2GK-H") was pulverized to give an activated carbon powder. A second adsorbent was obtained in the same manner as in Examples 1 to 3 except that a solid diluent (aluminum Al, calcium carbonate $CaCO_3$, combination of graphite and calcium carbonate $CaCO_3$), a lubricant (CMC), a binder resin (manufactured by Nippon Carbide Industries Co., Inc., an acryl emulsion "Nikasol FX-6074") and water were mixed in the proportion shown in Table 3 relative to 100 parts by mass of the obtained activated carbon powder (average particle diameter: 25 μm). For the evaluation of the evaporated fuel emission, the first adsorbent (the above-mentioned "2GK-H") and the second adsorbent were used in a ratio of 1900 ml of the first adsorbent relative to 300 ml of the second adsorbent.

The results are shown in Table 1 to Table 3. In Tables, DBAC represents a difference between a n-butane vapor concentration of 5% by volume and a n-butane vapor concentration of 50% by volume in n-butane adsorption volume (a difference in n-butane adsorption volume), and BWC represents a butane working capacity.

TABLE 1

|  | Unit | Examples | | | | |
| --- | --- | --- | --- | --- | --- | --- |
|  |  | 1 | 2 | 3 | 4 | 5 |
| Kind of solid diluent | — | MgO | MgO | Graphite | $CaCO_3$ | $CaCO_3$ |
| Amount of solid diluent | parts by mass | 80 | 120 | 110 | 100 | 60 |
| Amount of lubricant | parts by mass | 3.9 | 5 | 5 | 3.2 | 3.2 |
| Amount of binder (concentration: 50%) | parts by mass | 26 | 42 | 40 | 35 | 35 |
| Amount of water | parts by mass | 170 | 170 | 160 | 150 | 150 |
| Presence of acid washing | — | Absence | Absence | Absence | Presence | Presence |
| Filling ratio | g/mL | 0.49 | 0.55 | 0.43 | 0.25 | 0.27 |
| DBAC | g/L | 46 | 42 | 37 | 36 | 39 |
| BWC | g/dL | 10.5 | 9.5 | 8.4 | 9.1 | 9.5 |
| Desorption rate | % | 46.4 | 48.3 | 50.0 | 52.1 | 50.6 |
| Amount of evaporated fuel adsorption | g/CAN | 137 | 135 | 131 | 135 | 138 |
| Amount of evaporated fuel emission | mg/CAN | 96 | 80 | 96 | 88 | 84 |

TABLE 2

|  | Unit | Comparative Examples | | | | | | |
| --- | --- | --- | --- | --- | --- | --- | --- | --- |
|  |  | 1 | 2 | 3 | 4 | 5 | 6 | 7 |
| Kind of solid diluent | — | Activated carbon 2GK-H | Activated carbon BAX-1100 | Activated carbon BAX-LBE | MgO | MgO | MgO | Al |
| Amount of solid diluent | parts by mass |  |  |  | 40 | 220 | 500 | 120 |
| Amount of lubricant | parts by mass |  |  |  | 3.9 | 5.5 | 8 | 5 |

TABLE 2-continued

|  | Unit | Comparative Examples | | | | | | |
|---|---|---|---|---|---|---|---|---|
|  |  | 1 | 2 | 3 | 4 | 5 | 6 | 7 |
| Amount of binder (concentration: 50%) | parts by mass |  |  |  | 26 | 59 | 100 | 50 |
| Amount of water | parts by mass |  |  |  | 150 | 195 | 265 | 180 |
| Presence of acid washing | — |  |  |  | Absence | Absence | Absence | Absence |
| Filling ratio | g/mL | 0.33 | 0.354 | 0.392 | 0.44 | 0.65 | 0.74 | 0.43 |
| DBAC | g/L | 53 | 50 | 26 | 50 | 33 | 25 | 30 |
| BWC | g/dL | 13.9 | 11.6 | 6.2 | 11.4 | 7.9 | 5.6 | 7.7 |
| Desorption rate | % | 41.4 | 39.8 | 50.0 | 44.2 | 52.0 | 60.8 | 54.8 |
| Amount of evaporated fuel adsorption | g/CAN | 139 | 135 | 132 | 133 | 131 | 127 | 133 |
| Evaporated fuel emission | mg/CAN | 373 | 200 | 233 | 192 | 143 | 258 | 159 |

TABLE 3

|  | Unit | Comparative Examples | | | |
|---|---|---|---|---|---|
|  |  | 8 | 9 | 10 | 11 |
| Kind of solid diluent | — | Al | $CaCO_3$ | $CaCO_3$ | Graphite/$CaCO_3$ |
| Amount of solid diluent | parts by mass | 150 | 35 | 160 | 122/111 |
| Amount of lubricant | parts by mass | 5 | 3.2 | 5 | 8.9 |
| Amount of binder (concentration: 50%) | parts by mass | 50 | 30 | 46 | 37.8 |
| Amount of water | parts by mass | 190 | 150 | 170 | 233 |
| Presence of acid washing | — | Absence | Presence | Presence | Presence |
| Filling ratio | g/mL | 0.45 | 0.27 | 0.20 | 0.35 |
| DBAC | g/L | 28 | 43 | 30 | 27 |
| BWC | g/dL | 5.8 | 10.5 | 7.5 | 5.1 |
| Desorption rate | % | 58.9 | 44.7 | 56.3 | 60.5 |
| Amount of evaporated fuel adsorption | g/CAN | 126 | 139 | 130 | 119 |
| Evaporated fuel emission | mg/CAN | 272 | 111 | 145 | 215 |

As apparent from Table 1, each second adsorbent of Examples has a high desorption capacity in spite of a relatively high adsorption performance. Thus, the second adsorbent reduces the evaporated fuel emission while maintaining the high adsorption performance. In particular, the comparison of Example 4 with Comparative Example 9 reveals significant differences in the amount of the evaporated fuel emission at a difference of around 35 g/L in n-butane adsorption volume (DBAC) even in the case where the second adsorbent has a butane working capacity (BWC) of not less than 8 g/dL and a butane desorption rate of not less than about 45%. Moreover, from the comparison of Example 1 with Comparative Example 4, significant differences between both second adsorbents in the amount of the evaporated fuel emission can be found at a butane desorption rate of around 45% even if both second adsorbents have a difference in n-butane adsorption volume (DBAC) of not less than 35 g/L and a butane working capacity (BWC) of not less than 8 g/dL.

In Example 4, the solid diluent soluble in an acid was used, and the solid diluent was dissolved and removed in the acid from a granule to form a macropore, which causes a low packing density. However, the adsorption amount per weight of the adsorbent is not inhibited by the solid diluent, and the BWC performance can be maintained.

In Comparative Example 8 using the solid diluent Al, the solid diluent was not dissolved in an acid, Comparative Example 8 has a lower packing density compared with Examples 1 and 2. Moreover, the adsorption amount per weight of the adsorbent is inhibited due to the presence of the solid diluent Al, which causes a low BWC performance. Thus, the adsorbent used in Comparative Example 8 does not satisfy the requirements of the present invention.

Comparative Example 1 and Comparative Example 2 correspond to Comparative Example 2 of Patent Document 1 and Comparative Example 1 of Patent Document 1, respectively. Comparative Example 6 corresponds to Example 1 of Patent Document 1, and Comparative Example 8 corresponds to Example 3 of Patent Document 1. These Comparative Examples have significantly low advantages compared with Examples.

Experimental Example 2

The evaporated fuel emission was evaluated in the same manner except that the ratio (filling ratio) of the first adsorbent (the above-mentioned "2GK-H") relative to each second adsorbent obtained in Example 2, Comparative Example 3 and Comparative Example 4 was changed. The results are shown in Table 4 and FIG. 2.

TABLE 4

| First compartment (main chamber) | | Second compartment (auxiliary chamber) | | Ratio of auxiliary chamber (% by volume) | Evaporated fuel emission DBL (mg/CAN) |
|---|---|---|---|---|---|
| Kind of adsorbent | Volume (cc) | Kind of adsorbent | Volume (cc) | | |
| 2GK-H | 2050 | Comparative Example 3 | 150 | 6.8 | 267 |
| 2GK-H | 1900 |  | 300 | 13.6 | 233 |
| 2GK-H | 1600 |  | 600 | 27.2 | 172 |
| 2GK-H | 2050 | Comparative Example 4 | 150 | 6.8 | 223 |
| 2GK-H | 1900 |  | 300 | 13.6 | 192 |
| 2GK-H | 1600 |  | 600 | 27.2 | 120 |
| 2GK-H | 1500 |  | 700 | 31.8 | 106 |
| 2GK-H | 2050 | Example 2 | 150 | 6.8 | 157.3 |
| 2GK-H | 1900 |  | 300 | 13.6 | 80.4 |
| 2GK-H | 1500 |  | 700 | 31.8 | 74 |

Figure 2:
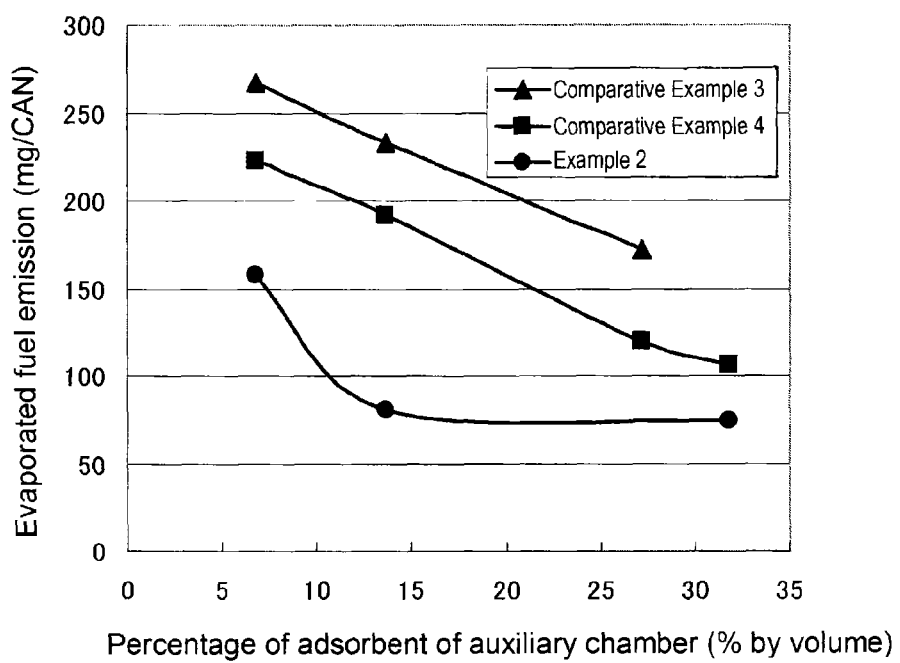
[FIG. 2]

As apparent from Table 4 and FIG. 2, the second adsorbent of Example significantly reduces the evaporated fuel emission in the range of 5% to 30% of the internal volume of the canister. This shows that the canister using the second adsorbent according to the present invention has significant advantages and is of great usefulness to achieve low emission.

[Industrial Applicability]

According to the present invention, the evaporated fuel emission is reducible. Thus, the present invention is useful for preventing the release of an evaporated fuel from a vehicle (e.g., a motor vehicle) using an evaporative fuel (a volatile fuel such as gasoline).

The invention claimed is:

1. A method for reducing release of an evaporated fuel, which comprises allowing a gaseous evaporated fuel to flow from at least one first compartment filled with a first adsorbent toward at least one second compartment filled with a second adsorbent for sequentially adsorbing the evaporated fuel onto the first adsorbent and the second adsorbent, and purging a gas from the second compartment toward the first compartment for desorbing the adsorbed evaporated fuel from the second adsorbent and the first adsorbent, wherein the second adsorbent has:
a difference in n-butane adsorption volume of not less than 35 g/L between a n-butane vapor concentration of 5% by volume and a n-butane vapor concentration of 50% by volume measured at 25° C.,
a butane working capacity measured in accordance with ASTM D5228 of not less than 8 g/dL, and
a butane desorption rate of not less than 45% when a purge air amount measured in accordance with ASTM D5228 is 30 bed volumes of the adsorbent volume, and
the second adsorbent comprises an activated carbon as an adsorption site and a solid diluent as a non-adsorption site.

2. A method for reducing release of an evaporated fuel, which comprises adsorbing and desorbing a gaseous evaporated fuel using a canister, the canister comprising at least one first compartment, at least one second compartment communicating with the first compartment and being disposed in a downstream side with respect to the first compartment, and an adsorbent for being filled in the first compartment and the second compartment, wherein a second adsorbent in the second compartment has:
a difference in n-butane adsorption volume of not less than 35 g/L between a n-butane vapor concentration of 5% by volume and a n-butane vapor concentration of 50% by volume measured at 25° C.,
a butane working capacity measured in accordance with ASTM D5228 of not less than 8 g/dL, and
a butane desorption rate of not less than 45% when a purge air amount measured in accordance with ASTM D5228 is 30 bed volumes of the adsorbent volume, and
the second adsorbent comprises an activated carbon as an adsorption site and a solid diluent as a non-adsorption site.

3. A method according to claim 1, wherein the second adsorbent in the second compartment has a volume of 5 to 30% relative to a total internal volume of the first compartment and the second compartment.

4. A method according to claim 1, wherein the second adsorbent comprises a granule containing 50 to 150 parts by mass of the solid diluent relative to 100 parts by mass of the activated carbon.

5. A method according to claim 1, wherein the solid diluent comprises at least one member selected from the group consisting of a metal oxide, a metal carbonate, and a graphite.

6. A method according to claim 1, wherein the solid diluent comprises magnesium oxide, a graphite, or both.

7. A method according to claim 1, wherein the second adsorbent comprises a granule comprising an activated carbon, a solid diluent soluble in a solvent or a chemical solution, and a binder insoluble in the solvent or the chemical solution, wherein the solid diluent is partly eluted and removed with the solvent or the chemical solution from the granule.

8. A method according to claim 1, wherein the second adsorbent comprises a granule comprising an activated carbon, a solid diluent soluble in an acid, and a binder resin insoluble in an acid, wherein the ratio of the solid diluent relative to 100 parts by mass of the activated carbon is 40 to 150 parts by mass, and the solid diluent is partly eluted and removed with the acid from the granule.

9. A method according to claim 8, wherein the solid diluent soluble in an acid is calcium carbonate.

10. A canister comprising:
a casing comprising at least one first compartment, and at least one second compartment communicating with the first compartment and being disposed in a downstream side with respect to the first compartment,
an adsorbent for being filled in the first compartment and the second compartment and for adsorbing and desorbing a gaseous evaporated fuel,
an introducing port of the casing, for introducing an evaporated fuel into the first compartment, and
an exhaust port of the casing, for exhausting an air flow from a lowermost-stream compartment, and
the canister allowing the adsorbed evaporated fuel onto the adsorbent in each compartment to be desorbed from the adsorbent by a suction gas from the exhaust port,
wherein a second adsorbent in the second compartment is the second adsorbent recited in claim 1.

11. A canister according to claim 10, wherein the casing comprises:
a first casing comprising at least the first compartment and
a second casing being coupled with the first casing in series and comprising at least the second compartment.

12. A motor vehicle provided with a canister recited in claim 10.

13. A method according to claim 2, wherein the second adsorbent in the second compartment has a volume of 5 to 30% relative to a total internal volume of the first compartment and the second compartment.

14. A method according to claim 2, wherein the second adsorbent comprises a granule containing 50 to 150 parts by mass of the solid diluent relative to 100 parts by mass of the activated carbon.

15. A method according to claim 2, wherein the solid diluent comprises at least one member selected from the group consisting of a metal oxide, a metal carbonate, and a graphite.

16. A method according to claim 2, wherein the solid diluent comprises magnesium oxide, a graphite, or both.

17. A method according to claim 2, wherein the second adsorbent comprises a granule comprising an activated carbon, a solid diluent soluble in a solvent or a chemical solution, and a binder insoluble in the solvent or the chemical solution, wherein the solid diluent is partly eluted and removed with the solvent or the chemical solution from the granule.

18. A method according to claim 2, wherein the second adsorbent comprises a granule comprising an activated carbon, a solid diluent soluble in an acid, and a binder resin insoluble in an acid, wherein the ratio of the solid diluent relative to 100 parts by mass of the activated carbon is 40 to 150 parts by mass, and the solid diluent is partly eluted and removed with the acid from the granule.

19. A method according to claim 18, wherein the solid diluent soluble in an acid is calcium carbonate.

20. A canister comprising:
- a casing comprising at least one first compartment, and at least one second compartment communicating with the first compartment and being disposed in a downstream side with respect to the first compartment,
- an adsorbent for being filled in the first compartment and the second compartment and for adsorbing and desorbing a gaseous evaporated fuel,
- an introducing port of the casing, for introducing an evaporated fuel into the first compartment, and
- an exhaust port of the casing, for exhausting an air flow from a lowermost-stream compartment, and the canister allowing the adsorbed evaporated fuel onto the adsorbent in each compartment to be desorbed from the adsorbent by a suction gas from the exhaust port,
- wherein a second adsorbent in the second compartment is the second adsorbent recited in claim 2.

21. A canister according to claim 20, wherein the casing comprises:
- a first casing comprising at least the first compartment and
- a second casing being coupled with the first casing in series and comprising at least the second compartment.

22. A motor vehicle provided with a canister recited in claim 20.

* * * * *